United States Patent Office 3,398,924
Patented Aug. 27, 1968

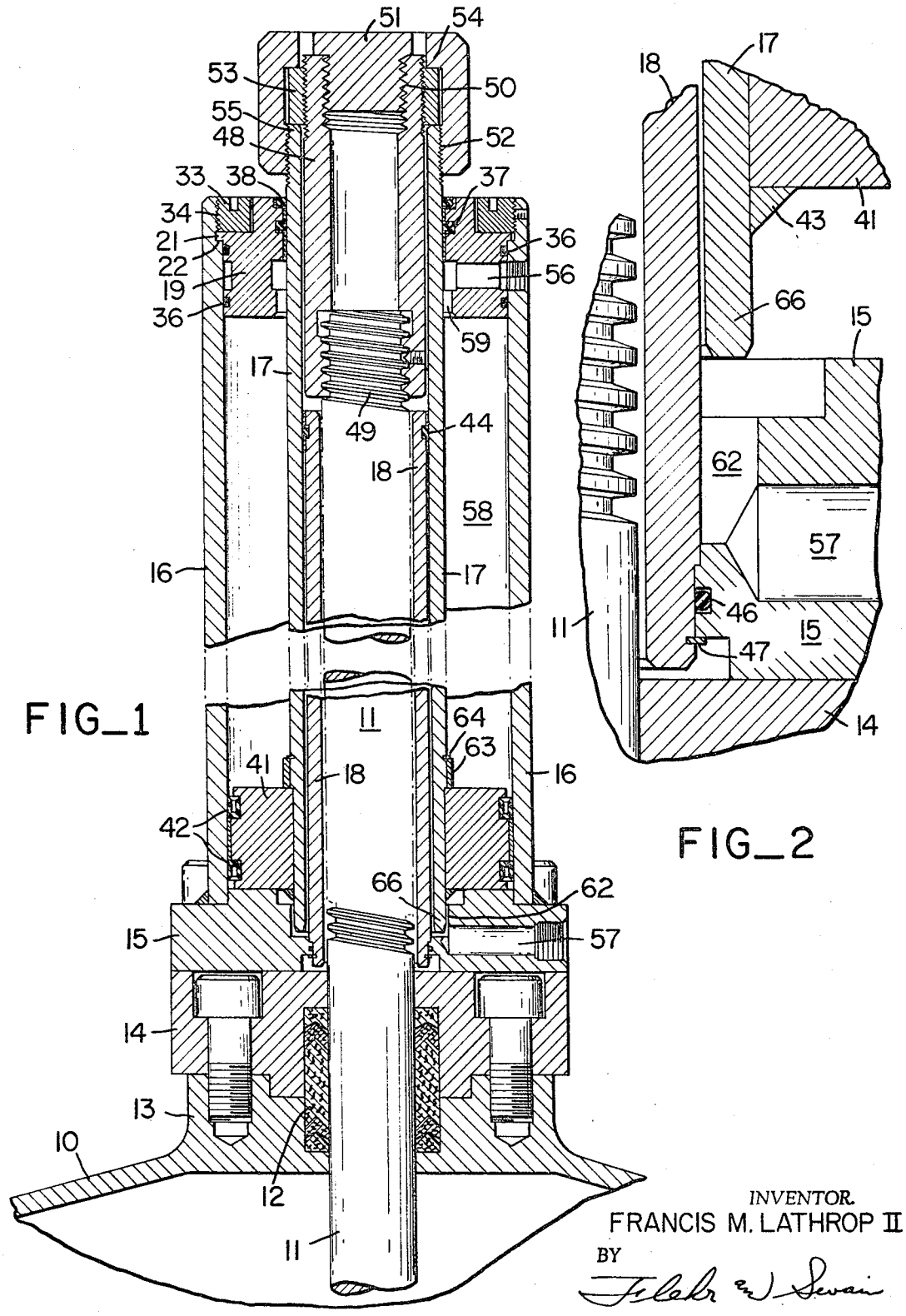

3,398,924
HYDRAULIC VALVE OPERATING DEVICE
Francis M. Lathrop II, Houston, Tex., assignor, by mesne assignments, to M & J Valve Company, Houston, Tex., a corporation of Delaware
Filed Apr. 26, 1966, Ser. No. 545,415
1 Claim. (Cl. 251—31)

ABSTRACT OF THE DISCLOSURE

A hydraulic operator for valves which can be mounted upon the valve body and attached to the valve operating rod. The rod extends through a fixed inner tube and its open end is secured to a concentric inner cylindrical member that is connected to a hydraulic piston operating within an outer cylinder. The upper end of the tube is sealed with respect to the inner cylindrical member.

---

This invention relates generally to hydraulic devices for the operation of gate valves.

Fluid flow control valves of the larger sizes, such as are employed in pipe line systems, are frequently operated by hydraulic devices somewhat similar to double acting hydraulic jacks. Where such devices are factory assembled with gate valves, the operating rod may be the central piston rod of the hydraulic device, with resulting simplification and economy in cost of manufacture. However, this arrangement is not possible where the device must be adapted to valves of various constructions and where it is common to employ threaded operating rods for engaging an external nut that is rotated manually or by motor means.

In general, it is an object of the present invention to provide a simple hydraulic device which can be applied to a wide variety of gate valves, including particularly gate valves which have threaded operating rods.

Another object of the invention is to provide a device of the above character which has means to prevent mechanical shock when the gate is moved to limiting positions corresponding to full open and closed valve conditions.

Another object is to provide a hydraulic device of the above character which can be readily installed on a wide variety of gate valves after removing conventional operating means.

Additional objects and features of the invention will appear from the following description in which the preferred embodiment has been set forth in detail in conjunction with the accompanying drawing.

Referring to the drawing:

FIGURE 1 is a side elevational view in section showing a hydraulic device in accordance with the present invention; and FIGURE 2 is a detail in section showing one of the means employed for preventing mechanical shock.

The device as shown in FIGURE 1 is installed on a conventional gate valve. Only the upper end of the valve is shown, including the body 10 and the operating rod or stem 11. The operating rod extends through the packing gland 12 which is carried by the upper bonnet portion 13 of the body. Normally, a structure is bolted to the bonnet portion 13 and which in a particular instance may include a conventional yoke and operating gear. All such parts are removed preparatory to installing my device, and an adaptor plate 14 is applied. A mounting plate 15 is attached to the adaptor plate by suitable means such as screws and bolts, and serves to carry a number of operating parts, including the outer cylindrical member 16, the inner cylindrical member 17, and the tubular member 18. These members are all concentrically disposed, and as will be presently explained when the device is being operated, relative axial movement occurs between the members 16 and 17.

The upper end of the normally vertical outer cylindrical member 16 is provided with a closure 19, which in effect forms a seal between cylindrical members 16 and 17. The closure 18 can be in the form of a metal annulus as illustrated, with a flange 21 seated upon the shoulder 22. It is held in place by the annular nut 33 which has threaded engagement 34 with the outer cylindrical member 16. Suitable means such as the spaced resilient O-rings 36 prevent leakage between the closure 19 and the outer cylindrical member 16. Also suitable means such as the resilient seal rings 37 and 38 prevent leakage between the closure 19 and the inner cylindrical member 17, while permitting the member 17 to move axially.

A piston 41 is fixed to the lower end of the inner cylindrical member 17, or in other words, it is fixed to that end of this member which is nearest the mounting plate 14. Suitable sealing means such as the resilient cup washers 42 prevent leakage between the piston and the inner surfaces of the outer cylindrical member 16. A weld connection 43 is shown for attaching the piston to the member 17. The upper end of the tubular member 18 is provided with a resilient seal ring 44 for forming a seal engagement with the inner surface of the cylindrical member 17. Here again the seal permits axial movement of the member 17 relative to the tubular member 18.

The lower end of the tubular member 18 is fitted within a central opening formed in the mounting plate 15. Suitable means such as a seal ring 46 of the resilient O-ring type prevents leakage between these parts. Also suitable means such as a snap-in ring 47 prevents retraction of the tubular member 18 relative to the plate 15.

The upper end of the inner cylindrical member 17 extends beyond the closure 19, and beyond the upper end of the outer cylindrical member 16. Means carried by this exterior end of member 17 serves to attach the upper end of the cylindrical member 17. Thus an extension member 48 has its lower end internally threaded for engagement with the threads 49 at the upper end of the operating rod 11. The upper end of member 48 has threaded engagement 50 with a cap 51, and this cap has threaded engagement 52 with the upper end of the cylindrical member 17. A thrust nut 53 also engages the upper threaded end of member 48, and is engaged between the annular shoulder 54 on the cap 51 and the end portion 55 on the cylindrical member 17.

It will be evident from the foregoing that the operating rod 11 of the gate valve is rigidly attached through member 48 with the upper end of the inner cylindrical member 17. Since the piston 41 is directly attached to the lower end of member 17, hydraulic pressure applied to one side or the other of this piston serves to move it upwardly or downwardly, together with member 17, whereby the valve gate is moved between its limiting open and closed positions. These limiting positions correspond with the positioning of the piston 41 in either the lower end of the cylindrical member 16 as illustrated, or in the upper end of the same adjacent the closure 19.

Ducts 56 and 57 are provided for admitting and exhausting hydraulic liquid. The upper duct 56 extends through the wall of the cylindrical member 16 and through the closure member 19 between the seals 36. It communicates with the annular space 58 between the outer and inner cylindrical members 16 and 17, through the annular space 59. The duct 57 is formed in the mounting plate 15 and communicates with the lower end of the space 58 below the piston 41, through the annular space 62. Immediately above the piston 41 there is a flow control member 63 in the form of a ring, which is retained in place by the snap-in ring 64. As the piston 41 approaches the upper limit of its movement, the ring 63 enters the space 59, thus limiting the cross-sectional flow area through space 59. Below the piston 41, the inner cylinder 17 is provided with the extension portion 66. This portion is adapted to enter the annular space 62 in the mounting plate 15 when the piston 41 moves downwardly and approaches its lower limiting position. The space 62 is likewise interposed between the duct 57 and the space below the piston 41.

Operation of the device described above is as follows. Assuming that the device is to be mounted upright upon a conventional gate valve of the general type illustrated, one first removes all of the parts mounted upon the bonnet portion 13, together with the operating nut which engages the threaded operating rod 11. The parts of my device are now mounted upon the valve body, together with the adaptor plate 14. As previously explained, this adaptor plate is constructed in accordance with the particular valve with which the operating device is to be used. After the plate 15 together with the outer and inner cylindrical members 16 and 17 are mounted upon the adaptor plate 14, the upper end of the operating rod is attached to the upper end of the inner cylindrical member 17 by the extension member 48. The ducts 56 and 57 are connected to a suitable hydraulic system whereby liquid under pressure can be supplied to one of these ducts, while the other duct is permitted to exhaust. This system may include a four-way valve or some other suitable means for reversing the hydraulic flow. Assuming that it is desired to raise the valve gate to open position, hydraulic liquid is supplied to the duct 57, while liquid is permitted to exhaust through the duct 56. Liquid supplied to duct 57 applies pressure to the lower side of the piston 41, whereby the piston together with the inner cylindrical member 17 is elevated. Thus the valve operating rod is elevated until the piston 41 approaches its upper limiting position. Near the upper limiting position, the control member 63 enters the space 59, with the result that flow of liquid through this space is greatly restricted, thus reducing the speed of movement of the piston to prevent mechanical shock. Eventually the piston comes to rest in direct abutting contact with the closure member 19. When it is desired to close the valve, application of liquid pressure is reversed. In other words, liquid under pressure is applied to the duct 56 and permitted to exhaust from the duct 57. Here again, as the piston approaches its lower limiting position, the annular portion 66 enters the space 62 with the result that flow of liquid is restricted and the speed of movement of the piston is greatly reduced to prevent mechanical shock.

It will be evident from the foregoing that I have provided a hydraulic valve operating device which has a number of desirable features. Particularly, the device is relatively simple in construction and therefore can be economically manufactured. It can be readily adapted for mounting on a wide variety of gate valves. The mounting and attachment of my device to a valve is a relatively simple matter, and can be carried out under either factory or field conditions.

I claim:

1. In a valve operating device adapted for use in gate valves having an operating rod extending exterior of the body and movable in opposite directions between limiting positions corresponding to open and closed conditions of the valve, normally upright concentric first outer and second inner cylindrical members, a tubular member extending concentrically within the inner member, the tubular member being adapted to accommodate the operating rod of the valve, mounting means secured to the lower end of the outer cylindrical member and adapted to be secured to the valve body, the mounting means forming a lower closure for the outer cylindrical member, the lower end of the tubular member being secured to said mounting means, closure means at the upper end of the outer cylindrical member for forming a slidable seal between the outer and the inner cylindrical members while permitting axial movement of said inner cylindrical member, a piston attached to the lower end of the inner cylindrical member, said piston having sealed slidable engagement with the outer cylindrical member, the upper of the inner cylindrical member extending beyond the upper end of the outer cylindrical member and said upper closure means, means forming a seal between the tubular member and the inner cylindrical member while permitting axial movement of said inner cylindrical member, ducts communicating adjacent the extremities of the outer cylindrical member and forming means for hydraulic communication with the spaces on opposite sides of the piston, and means disposed above the upper end of said tubular member forming an attachment between the upper end of the inner cylindrical member and the corresponding upper end of the valve operating rod, said means consisting of an extension member having threaded engagement with the operating rod and extending to the upper end of the inner cylindrical member, and a cap having threaded engagement with the upper end of the inner cylindrical member and serving to secure the upper end of the extension member to the upper end of the inner cylindrical member.

References Cited

UNITED STATES PATENTS

| | | | |
|---|---|---|---|
| 1,927,366 | 9/1933 | Hall | 251—14 |
| 2,493,602 | 1/1950 | Sterrett | 91—396 |
| 2,733,041 | 1/1956 | Crookoton | 251—14 |
| 3,052,444 | 9/1962 | Kintner | 251—62 |
| 3,247,767 | 4/1966 | Aslan | 91—396 X |

ARNOLD ROSENTHAL, *Primary Examiner.*